Figure 1:
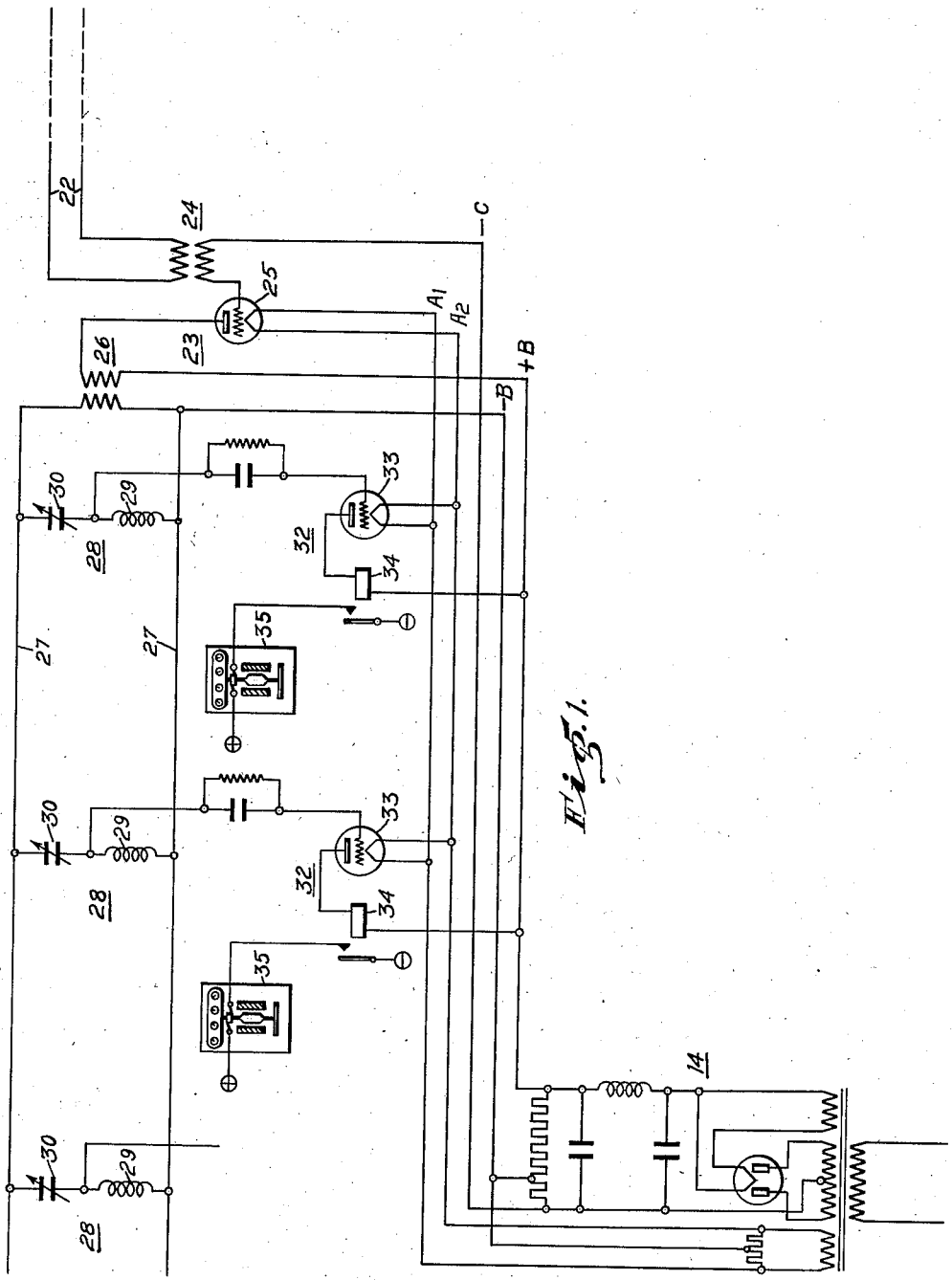

May 25, 1937.  R. N. STODDARD  2,081,684
METERING SYSTEM
Filed April 15, 1932   3 Sheets-Sheet 1

WITNESSES:
R. S. Williams
R R Lockwood

INVENTOR
Ralph N. Stoddard.
ATTORNEY

May 25, 1937.  R. N. STODDARD  2,081,684
METERING SYSTEM
Filed April 15, 1932  3 Sheets-Sheet 3

WITNESSES:
R. S. Williams
R. R. Lockwood

INVENTOR
Ralph N. Stoddard.
ATTORNEY

Patented May 25, 1937

2,081,684

UNITED STATES PATENT OFFICE 2,081,684

METERING SYSTEM

Ralph N. Stoddard, Pittsburgh, Pa., assignor to Westinghouse Electric & Manufacturing Company, a corporation of Pennsylvania Application April 15, 1932, Serial No. 605,546

6 Claims. (Cl. 177—351)

My invention relates generally to metering systems and it has particular relation to metering the circuits in an electric power transmission system from a remote point.

In the development and extension of the application of remote control and metering systems, the problem of providing a sufficient number of control circuits at a minimum cost and with a maximum degree of reliability has developed into one of increasing importance. The difficulties encountered in solving this problem have been increased to a marked extent by the demand for metering functions over a greater distance and area than heretofore has been contemplated or considered possible.

Generally stated, it is an object of my invention to provide a metering system which shall be simple, reliable and efficient in operation and readily and economically manufactured and installed.

A more specific object of my invention is to provide for metering the power flow in a plurality of circuits and for transmitting indications of the amount of power flow over a single signalling circuit to a remotely located central point where the power flow in each circuit may be recorded.

Another object of my invention is to provide for simultaneously transmitting to a remote point over a single signalling circuit, an indication of the instantaneous power flow in a circuit and also the total power flow in the circuit and for receiving and recording the indications at the remote point.

Other objects of my invention will, in part, be obvious and, in part appear hereinafter.

My invention, accordingly, is disclosed in the embodiment hereof shown in the accompanying drawings, and comprises the features of construction, combination of elements and arrangement of parts which will be exemplified in the construction hereinafter set forth, and the scope of the application of which will be indicated in the appended claims.

According to my invention, I provide for metering various circuits in the system, from a remote point over a single control and signalling circuit. The metering operations are performed, in general, by using oscillations of different non-interfering frequencies in such manner that the single control and signalling circuit is used as if it were individual to a particular part of the apparatus which is used to perform the desired function. Suitable receiving apparatus is provided which is arranged to receive only a predetermined frequency or a predetermined band of frequencies, thereby providing for the individual reception of impulses which may be applied to the single control and signal circuit.

Figure 2:
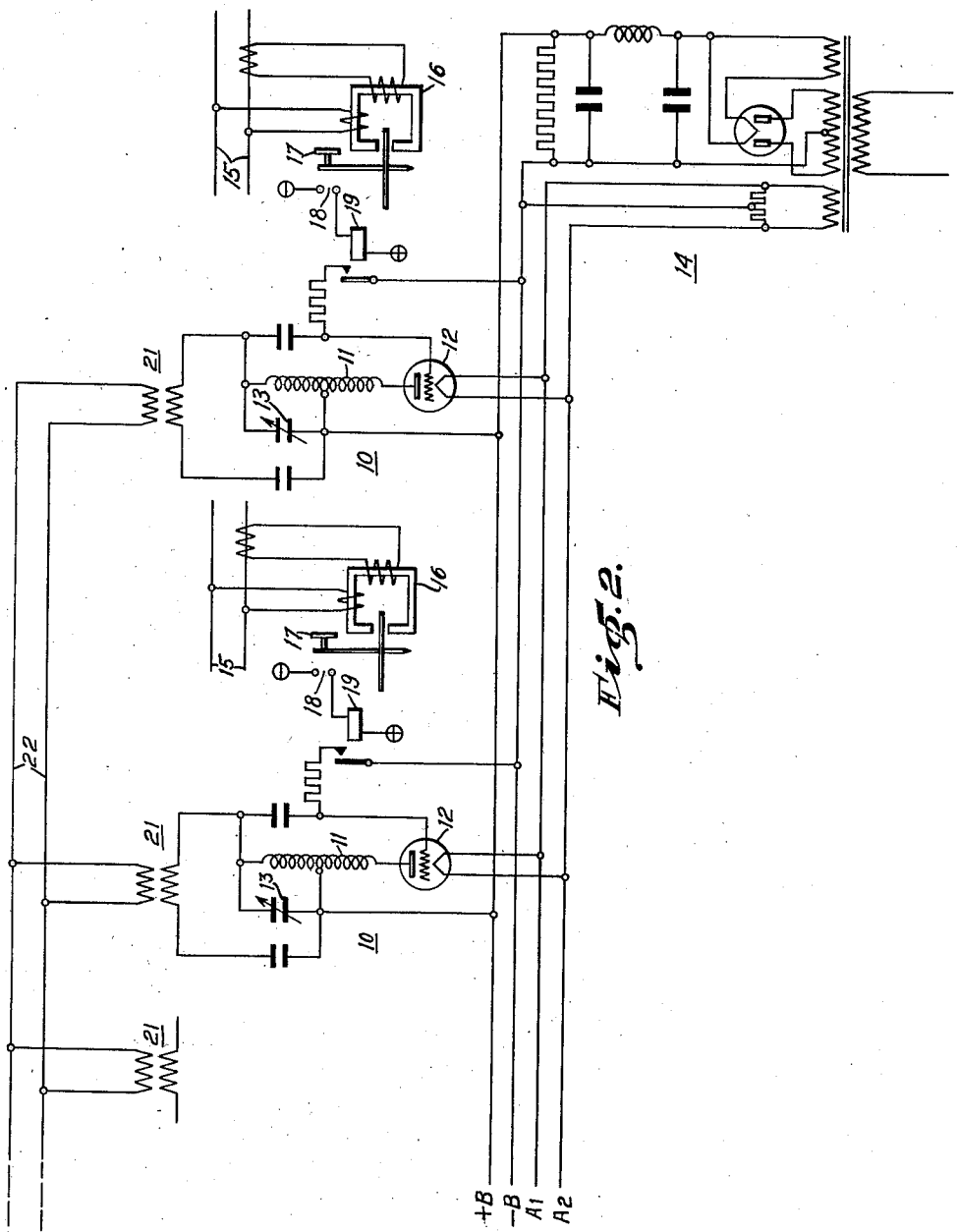
Figure 3:
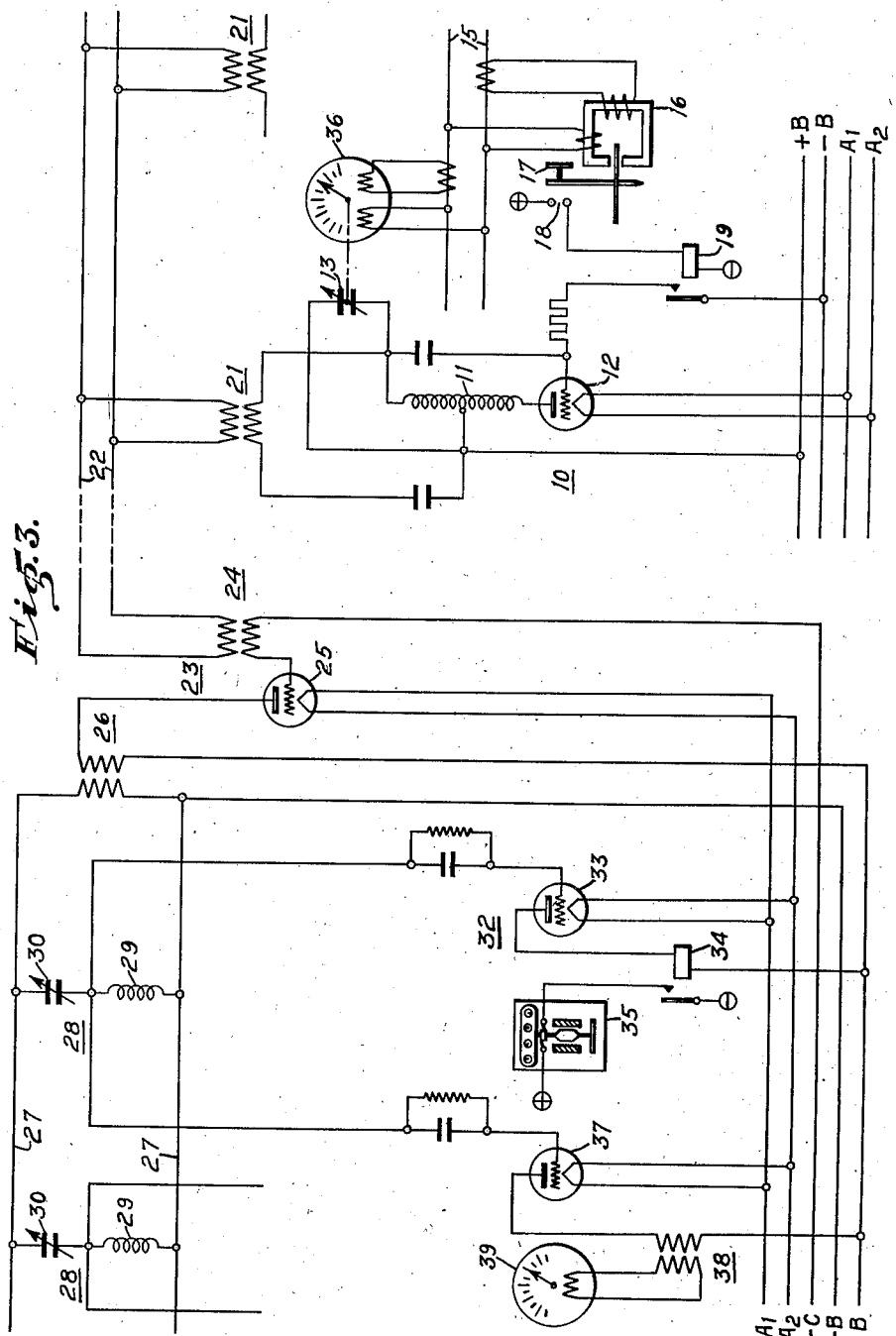

For a more complete understanding of the nature and scope of my invention, reference may be had to the following detailed description taken in connection with the accompanying drawings, in which Figures 1 and 2 taken together constitute a diagrammatic view of the connections for a remote metering system organized in accordance with this invention, and Fig. 3 is a diagrammatic view of a modification of the metering system shown in Figs. 1 and 2.

Since certain parts or elements of this invention are common to all of the modifications shown in the several figures, the same numerals, in general, will be used throughout this specification to indicate identical parts or elements.

Referring now to Figs. 1 and 2 of the drawings, the remote metering system there shown comprises an oscillation generator, shown generally at 10, of well known construction, which includes an inductance coil 11 connected in the plate circuit of a three-electrode vacuum tube 12 and a variable condenser 13 by means of which the frequency of oscillation of the generator may be varied in the usual manner. Any suitable current source may be used for heating the filament of the vacuum tube 12 and for applying thereto the desired plate and grid potentials such as the full wave rectifier, shown generally at 14, which may be connected to an alternating current source. Since the rectifier 14 is not an element of the present invention and in addition is of well known construction, it has been deemed unnecessary to describe it in detail.

In order to measure the total power flow in an alternating-current circuit represented by conductors 15, an induction type watt-hour meter 16, of well known construction, is connected to the conductors 15, as shown, and has mounted on its rotating shaft a contact member 17 which is disposed to bridge contact members 18 once during each revolution of the disc of the meter.

It will be readily understood that several contact members may be provided on the rotating shaft in the form of a commutator, so that the contacts 18 may be bridged more than once during each revolution of the disc of the meter.

When the contacts 18 are bridged, a transmitting relay 19 is energized from a suitable source of direct current which is indicated in the customary manner by plus and minus signs surrounded by circles. The energization of transmitting relay 19 serves to apply negative potential to the grid of the vacuum tube 12, thereby causing the generator 10 to function and generate an impulse comprising oscillations having a frequency which is determined by the setting of the variable condenser 13. The impulse thus generated is applied through a circuit including an insulating transformer 21 to a signalling circuit represented by conductors 22.

While the signalling circuit is represented by continuous conductors 22, it will be readily understood that this circuit may be provided with the usual telephone circuit devices such as repeating coils, loading coils, amplifiers and the like. Since an impulse of alternating current is applied to the signalling circuit, it is apparent that the usual telephone talking circuit may be used and that it is not essential that the circuit be conductively continuous.

It will be readily apparent to one skilled in the art that the usual phantom circuits may be used in connection with this invention to provide a suitable signalling circuit, which is represented in this application by means of conductors 22. It will also be apparent that the signalling impulses may be superimposed on a carrier current system or on a radio transmitting system, and that essentially the same results will be obtained when this type of signalling circuit is used.

It is also contemplated that this system may be used on existing supervisory control systems which are of the direct current type, in which direct-current impulses are utilized for performing the desired operations. It will be readily understood that the alternating-current system may be superimposed on this direct-current system, and that the direct current signalling system between two or more stations, which may be already installed, can be utilized for this purpose.

The impulse applied to the signalling circuit in response to the energization of transmitting relay 19 by the generator 10 is amplified by means of an amplifier, shown generally at 23, of standard and well known construction, which includes a second insulating transformer 24 for connecting the signalling circuit to the grid circuit of a three-electrode vacuum tube 25 and a plate transformer 26 connected, as shown in the plate circuit of the vacuum tube 25. The entire output of the amplifier 23 is then applied through the plate transformer 26 to a common circuit represented by conductors 27.

With a view to receiving an impulse of a predetermined frequency only, a filter circuit, shown generally at 28, is employed which comprises an inductance coil 29 and a variable condenser 30 which are connected in series-circuit relation to conductors 27 of the common circuit. As will be readily understood the condenser 30 may be adjusted so that only a predetermined frequency is permitted to traverse the filter circuit 28 while all other frequencies are excluded therefrom.

A receiver, shown generally at 32, is provided for receiving the impulse originated in response to the energization of the transmitting relay 19. The receiver 32 comprises a three-electrode vacuum tube 33 having its grid connected in the usual manner, as shown, to the filter circuit 28 and a receiving relay 34 connected in the plate circuit of the vacuum tube 33.

As set forth hereinbefore, any suitable current source may be used for heating the filaments of the vacuum tubes 25 and 33 and for applying thereto, the desired plate and grid potentials such as the full wave rectifier 14.

The application of the impulse of frequency to the receiver 32 causes the receiving relay 34 to be energized, thereby completing a circuit for operating an integrating meter 35 which is arranged to totalize and record the number of impulses which are caused to be applied to the system by the watt-hour meter 16.

Since the number of revolutions of the disc of the watt-hour meter 16 and consequently the number of times the contacts 18 are bridged is a function of the amount of power flow in the circuit represented by the conductors 15, it will be apparent that the number of impulses of oscillations applied to the signalling circuit is also a function of the power flow. As a result, the receiving relay 34 will be energized exactly the same number of times that the transmitting relay 19 is energized which in turn operates the integrating meter 35 to totalize the power flow in the power circuit 15.

The use of a filter circuit 28, which may be tuned within predetermined narrow limits, readily permits the use of the single signalling circuit for metering more than one power circuit and transmitting impulses to a receiver in accordance with the system hereinbefore set forth. Accordingly, a second power circuit, transmitting unit, receiver and integrating meter are illustrated in the drawings and provision is made for connecting a third system to the signalling circuit. However, it will be readily understood that several more power circuits may be metered over the single circuit by merely adjusting the variable condenser 13 in the oscillation generator 10 to cause a frequency to be generated which is different from the frequencies supplied by the other generators. The variable condenser 30 of the corresponding filter circuit 28 is then adjusted to tune this circuit to the desired frequency.

It will be observed that the metering system may be used in a power system application where the receiving units are located in a central office or main station while the transmitting units may be located in the same sub-station or different sub-stations, all of the stations having, however, a common signalling circuit. It will also be apparent that, if the frequencies utilized for practicing my invention are in the voice frequency band, the usual telephone talking circuit may be used for the signalling circuit. When a circuit of this type is used, there is apparently no limit to the distance apart that the transmitting and receiving units may be placed for satisfactory operation of the system.

Referring now to Fig. 3 of the drawings, the metering system there shown is similar to that shown in Figs. 1 and 2 except for the addition of metering apparatus for transmitting an indication of the instantaneous value of the power flow in the power circuit, the total power flow of which it is desired to measure. More specifically, the system shown in Fig. 3 is arranged to simultaneously and continuously transmit indications of the watts and watt-hours in an electrical circuit to a remote point where these indications may be recorded.

In addition to the transmitting and receiving apparatus described hereinbefore for integrating the total power flow in the power circuit, a watt-meter 36 is provided and connected to the power circuit in the well known manner. As shown in the diagram, the watt-meter 36 is provided with a driving connection to the variable condenser 13 which in this instance is a part of the generator 10. It will then be readily understood that the frequency of the oscillations supplied by the generator 10 will be varied within predetermined limits in accordance with the instantaneous value of the power flow in the power circuit.

At the receiving end of the signalling circuit the filter circuit 28 is tuned to the predetermined band of frequency within which it is arranged that the generator 10 shall oscillate in accordance with the adjustment of the variable condenser 13, as determined by the power flow in the power circuit. An additional three-electrode vacuum tube 37 is provided having its grid circuit connected to the filter circuit 28, as illustrated, and a transformer 38 is connected in its plate circuit in order to operate a frequency responsive indicating meter 39.

Since the frequency, which is transmitted by the generator 10, is a function of the watts in the power circuit, and indicating meter 39 is responsive to this frequency, it is evident that the indicating meter 39 may be calibrated in units of watts and will continuously indicate the instantaneous flow of power in the power circuit 15.

It will be observed that, in this instance, simultaneous indications of watts and watt-hours are transmitted. In practice the power flow will normally be of such value that the disc of the watt-hour meter 16 will rotate rapidly, thereby causing the transmitting relay 19 to be energized a sufficient portion of the time to provide satisfactory operation of the part of the system which is used for transmitting and receiving the watt indication. However, if the time of energization of the transmitting relay 19 is not sufficiently long as to provide for satisfactory operation of the watt indicating system, the operation of this relay may be reversed insofar as its contacts are concerned which may be arranged to open the grid circuit of the vacuum tube 12 to negative potential rather than to close this circuit, as shown in the drawing.

If it is desired to simultaneously transmit and receive indications of watts and watt-hours for a plurality of power circuits, it is only necessary to provide additional transmitting and receiving units similar to that shown in the drawings and tune each of the generators to supply oscillations in a band different from the band in which any other oscillator is tuned to operate. In like manner the filter circuits 28 of the receiving units are each tuned to receive oscillations in the desired frequency band and their associated indicating meters 39 calibrated accordingly.

It will be observed that any suitable current source may be used for heating the filaments of the vacuum tubes shown in Fig. 3, such as the full wave rectifier 14 similar to those shown in connection with the metering systems of Figs. 1 and 2. However, in order to reduce the complication of the circuits to a minimum, the current source is not shown in detail in this or any of the succeeding figures of the drawings.

It will be readily understood that, while the metering systems shown in Figs. 1, 2 and 3 are described as applicable to measuring alternating current power and transmitting indications thereof to a remote point, these systems may be used for many other purposes as will be readily apparent to one skilled in the art.

Since further changes may be made in the above circuits and different embodiments of the invention may be made without departing from the scope thereof, it is intended that all matter contained in the above description or shown in the accompanying drawings should be interpreted as illustrative and not in a limiting sense.

I claim as my invention:

1. A metering system comprising, in combination, a single circuit, a normally non-operating oscillation generator connected to the circuit and arranged to generate a predetermined frequency, relay means for initiating and arresting the functioning of the generator, metering means for controlling the operation of the relay means to apply the oscillations from the generator to the circuit as a series of alternating current impulses the number being proportional to a quantity being measured, receiving means connected to the circuit and responsive only to impulses having said predetermined frequency of the generator, and means operated from the receiving means for totalizing the alternating current impulses.

2. A metering system comprising, in combination, a first station, a second station, a single circuit connecting the stations, a normally non-operating oscillation generator connected to the circuit at the second station and arranged to generate a predetermined frequency, a sending relay for initiating and arresting the functioning of the generator, power metering means for controlling the operation of the relay means to cause the oscillations from the generator to be applied to the circuit as a series of alternating current impulses, the number of said alternating current impulses being proportional to the quantity of power being measured, amplifying means at the first station for amplifying the oscillations applied to the circuit by the generator, receiving means connected to the amplifying means and responsive only to impulses of said predetermined frequency of the generator, a receiving relay operated from the receiving means in synchronism with the operation of the sending relay, and a totalizing meter operated by the receiving relay for recording the number of alternating current impulses.

3. A metering system comprising, in combination, a first station, a second station, a single circuit connecting the stations, a transmitting unit connected to the circuit at the second station comprising a normally non-operating oscillation generator arranged to generate a predetermined frequency, a sending relay for initiating and arresting the functioning of the generator, and metering means for controlling the operation of the relay means to apply the oscillations from the generator to the circuit as a series of alternating current impulses, the number being proportional to a quantity being measured, amplifying means at the first station for amplifying the oscillations applied to the circuit from the transmitting unit and supplying the output to a common circuit, and a receiving unit connected to the common circuit comprising a tuned circuit connected to the common circuit and responsive only to impulses of said predetermined frequency supplied from the transmitting unit, thermionic means connected to the tuned circuit, a relay connected in the output circuit of the thermionic means and operable in synchronism with the sending relay of the transmitting unit, and a totalizing meter operated by the receiving relay to record the number of alternating current impulses from the transmitting unit.

4. A metering system comprising, in combination, a first station, a second station, a single circuit connecting the stations, a generator at the second station for applying oscillations within a predetermined band of frequency to the circuit and having means operable to vary its frequency, metering means connected to the generator for causing the oscillations to be applied to the circuit as a series of impulses, the number being proportional to the value of a quantity being measured, a second meter, means connecting the second meter to the frequency varying means of the generator for varying the frequency of the oscillations included in the impulses as a function of the instantaneous value of the quantity being measured, and means connected to the circuit at the first station responsive only to oscillations within said predetermined band of frequency for independently totalizing the number of impulses applied to the circuit and indicating the varying frequency of the oscillations included therein.

5. A metering system comprising, in combination, a single circuit, a generator for applying oscillations within a predetermined band of frequency to the circuit and having means operable to vary the frequency, relay means for initiating and arresting the functioning of the generator, measuring means for controlling the operation of the relay means to cause the oscillations from the generator to be applied to the circuit as a series of impulses, the number being proportional to the integrated value of a quantity being measured, a second measuring means, means connecting the second measuring means to the frequency varying means of the generator for varying the frequency of the oscillations included in the impulses as a function of the instantaneous value of the quantity being measured, and metering means connected to the circuit and responsive only to oscillations within said predetermined band of frequency for independently totalizing the number of impulses applied to the circuit and indicating the varying frequency of the oscillations included therein.

6. A metering system comprising, in combination, a first station, a second station, a single circuit connecting the stations, a generator at the second station for applying oscillations within a predetermined band of frequency to the circuit and having means operable to vary the frequency, a sending relay for initiating and arresting the functioning of the generator, power metering means controlling the operation of the relay means to cause the oscillations from the generator to be applied to the circuit as a series of impulses the number being proportional to the integrated value of the power being measured, a second meter means connecting the second meter to the frequency varying means of the generator for varying the frequency of the oscillations included in the impulses as a function of the instantaneous value of the power being measured, amplifying means at the first station for amplifying the oscillations applied to the circuit by the generator, receiving means connected to the amplifying means and responsive only to impulses having a frequency within said predetermined band of frequency of the generator, a receiving relay operated from the receiving means in synchronism with the operation of the sending relay, a totalizing meter operated by the receiving relay to record the number of impulses transmitted by the power metering means, additional receiving means connected to the amplifying means and responsive only to impulses having a frequency within said predetermined band of frequency of the generator, and indicating means operated by the additional receiving means and responsive to the varying frequency of oscillation effected by the second meter to indicate the instantaneous value of the power being measured.

RALPH N. STODDARD.